Jan. 20, 1953     H. F. REIMANN     2,626,013
CENTRIFUGAL AIR CLEANER FOR INTERNAL-COMBUSTION ENGINES
Filed Sept. 7, 1951     2 SHEETS—SHEET 1
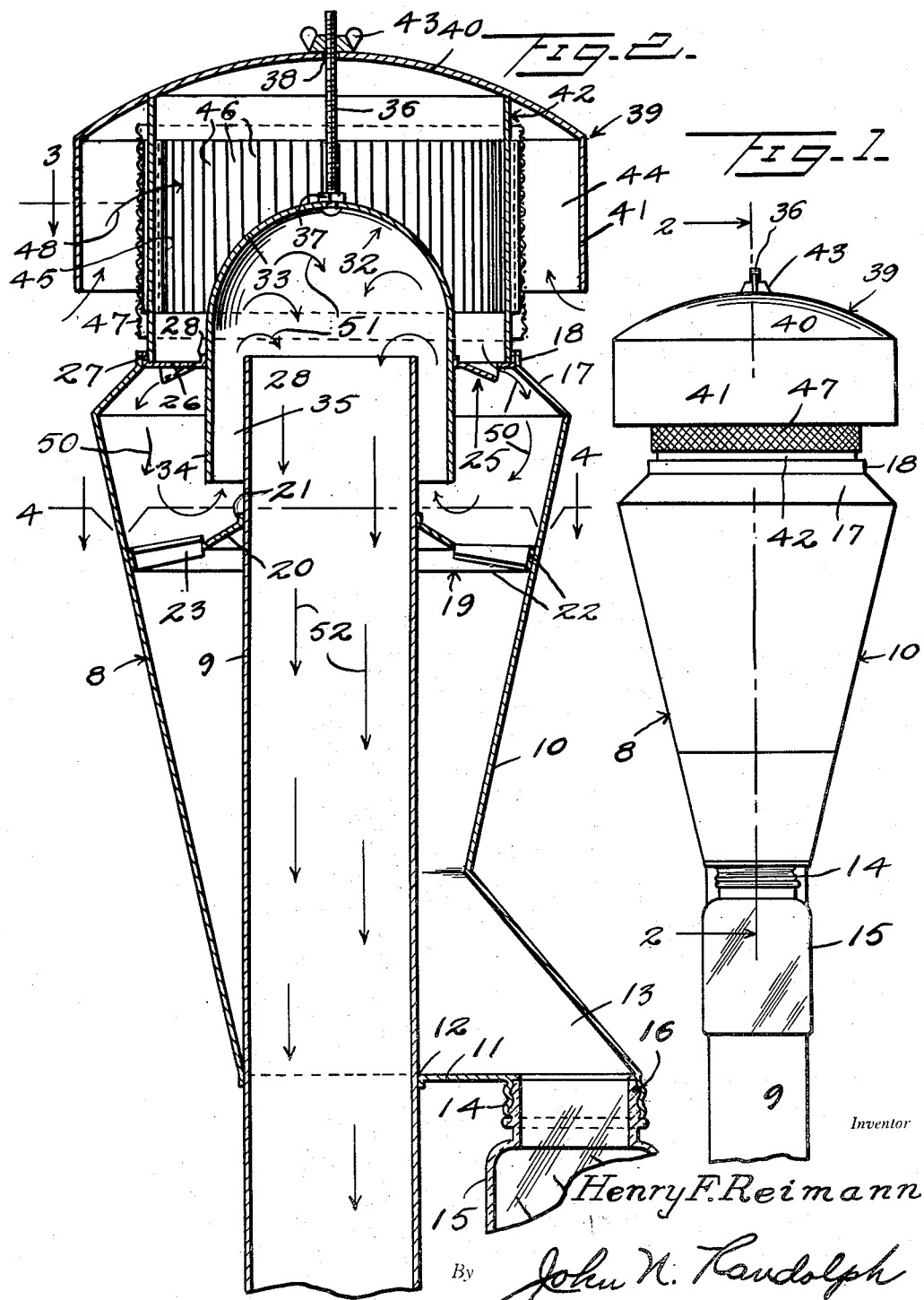
Inventor
Henry F. Reimann
By John N. Randolph
Attorney Jan. 20, 1953 H. F. REIMANN 2,626,013
CENTRIFUGAL AIR CLEANER FOR INTERNAL-COMBUSTION ENGINES
Filed Sept. 7, 1951 2 SHEETS—SHEET 2
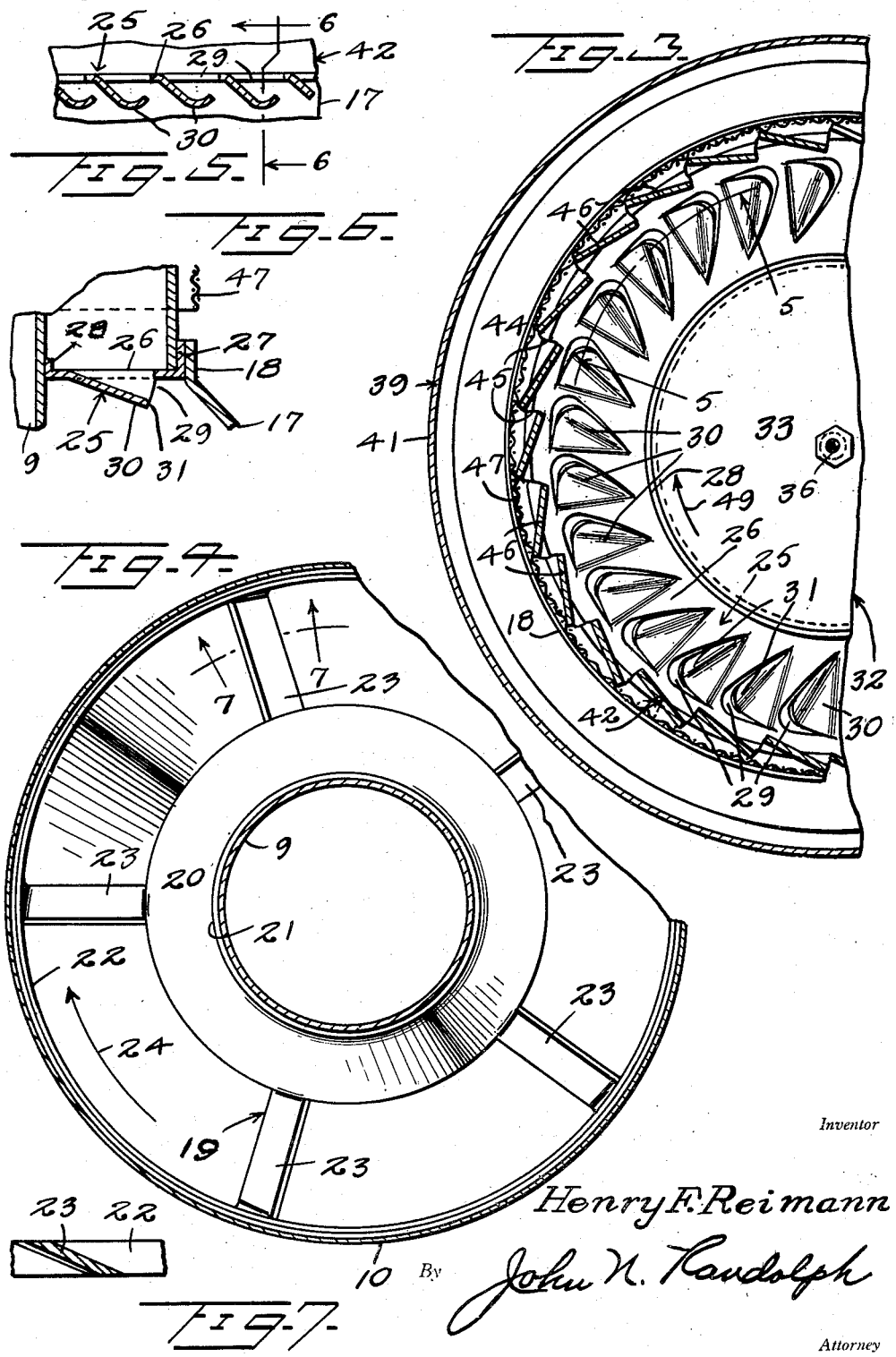
Inventor
Henry F. Reimann
By John N. Randolph
Attorney Patented Jan. 20, 1953

2,626,013

UNITED STATES PATENT OFFICE 2,626,013

CENTRIFUGAL AIR CLEANER FOR INTERNAL-COMBUSTION ENGINES

Henry F. Reimann, Ashton, Idaho

Application September 7, 1951, Serial No. 245,539

9 Claims. (Cl. 183—66)

1

This invention relates to a novel air cleaner and dust collector adapted to be mounted on the air intake conduit of an internal combustion engine for imparting a centrifugal or whirling motion to air as it enters the cleaner for separating dirt from the air and for discharging the separated dirt downwardly and away from the intake end of the air inlet conduit so that only the cleansed air will enter and pass through the intake conduit.

More particularly, it is the aim of the present invention to provide an air cleaner for use with air intake conduits, as for example, a downdraft type air intake conduit wherein the air enters the conduit at the upper end thereof, which is so constructed that a suction will be created in the air cleaner for drawing air into the cleaner above the intake conduit and for imparting a whirling motion to the air as it initially enters the cleaner and for thereafter imparting additional whirling motion to the air in which the air is simultaneously deflected downwardly and the dirt is deflected downwardly and outwardly away from the upper inlet end of the air conduit for most effectively separating dirt and foreign matter from the air before the cleansed, light air is drawn into the air intake conduit.

Still a further object of the invention is to provide an apparatus wherein the dirt laden air is deflected downwardly below the level of the intake end of the air intake conduit so that heavy particles of dirt will be effectively prevented from rising and entering the air intake conduit.

A further object of the invention is to provide an air cleaner wherein air is initially drawn by suction in an upward direction into the air cleaner and then drawn downwardly and subjected to a whirling motion to separate dirt and foreign matter from the air by centrifugal force, after which the air is drawn upwardly and inwardly so that the heavier particles of dirt and foreign matter are thrown or flipped therefrom and continue to move downwardly into a collection receptacle and while the cleansed air is drawn upwardly and inwardly toward the intake end of the air intake conduit.

Still a further object of the invention is to provide an air cleaner wherein the separated dirt and foreign matter will be conveyed by gravity and by additional deflecting means downwardly into a removable collecting receptacle in which the dirt and foreign matter will be retained until the receptacle is removed and emptied.

Various other objects and advantages of the invention will hereinafter become more fully apparent from the following description of the drawings, illustrating a prsently preferred embodiment thereof, and wherein:

Figure 1 is a side elevational view showing the air cleaner applied to an air intake conduit;

Figure 2 is an enlarged longitudinal sectional view taken substantially along a plane as indicated by the line 2—2 of Figure 1;

Figure 3 is a fragmentary horizontal sectional view on an enlarged scale, taken substantially along a plane as indicated by the line 3—3 of Figure 2;

Figure 4 is an enlarged fragmentary cross sectional view of the air cleaner taken substantially along a plane as indicated by the line 4—4 of Figure 2;

Figure 5 is a fragmentary circumferential sectional view taken substantially along a plane as indicated by the line 5—5 of Figure 3;

Figure 6 is a fragmentary radial sectional view, taken substantially along a plane as indicated by the line 6—6 of Figure 5, and Figure 7 is a fragmentary sectional view taken substantially along a plane as indicated by the line 7—7 of Figure 4.

Referring more specifically to the drawings, the novel air cleaner in its entirety is designated generally 8 and is shown applied to an internal combustion engine air inlet conduit or pipe 9, the upper portion only of which is illustrated. The conduit or pipe 9 is of the down draft type wherein its upper end constitutes its inlet end and as will hereinafter become apparent, the air cleaner 8 is particularly adapted for use with a downdraft type air inlet conduit.

The air cleaner 8 includes an upright generally frusto-conical shaped housing 10 having a bottom wall 11 at its restricted, lower end provided with a flange opening 12 through which a portion of the conduit 9 extends. The housing 10 is secured around its flanged opening 12 in any suitable manner to the conduit 9. Said housing 10 adjacent its lower end is provided with a lateral extension or enlargement 13 the bottom part of which is defined by a part of the bottom wall 11 and which bottom portion is provided with a depending threaded boss 14 which opens upwardly into the enlargement 13. A conventional jar or similar receptacle 15 having an externally threaded neck 16 is threaded upwardly into the boss 14 so that the jar neck opens upwardly into the enlargement 13 of the housing 10. The downwardly tapered frusto-conical portion of the housing 10 extends to near its enlarged, upper end and terminates in an upwardly tapered frusto-conical portion 17 having an annular upright flange 18 defining the restricted open upper end of said housing portion 17 and the open top of the housing 10. The flange 18 is disposed concentrically around at substantially the same level as the open upper end of the conduit 9.

A deflector, designated generally 19, is disposed around the pipe 9 and within the housing 10 at a point somewhat below its upper end and includes an inner ring member 20 which is relatively wide radially and has an upturned flange 21 at its inner edge which is disposed around and suitably secured to the pipe 9, said ring member 20 extending outwardly and downwardly from its flange 21. The deflector member 19 includes an outer ring 22 which is disposed on the inner side of and against a portion of the housing 10 and which is connected to the periphery of the ring member 20 by a plurality of radially extending vanes 23 each of which is inclined from one side of the radial edge to the other side edge thereof and each of which is likewise inclined outwardly and downwardly, so that the ring 22 is disposed below the level of the outer edge of the number 20. As seen in Figure 4, all of the spoke-like vanes 23 are inclined in the same direction transversely or circumferentially thereof and said vanes are inclined downwardly between their radial edges in a clockwise direction as seen from above, or as indicated by the arrow 24 in Figure 4.

A second, upper deflector, designated generally 25 includes an annular plate 26 which is disposed within the open upper end of the housing 10 and which is provided with an upstanding peripheral flange 27 which bears against and is suitably secured to the inner side of the flange 18. The plate 26 is also provided with an upturned flange 28 at its inner edge. As best illustrated in Figures 3, 5 and 6, the plate 26 provided with a circumferentially spaced series of struck-out portions which are bent downwardly to form circumferentially spaced air passages 29 and each of which portions 30 to form a deflector blade or vane which extends downwardly in a circumferential direction from its secured end and which increases in width from the inner toward the outer edge of the plate 26. As best illustrated in Figures 2, 5 and 6, the vanes 30 have concavely bowed upper surfaces and convexly bowed under surfaces and are likewise provided with rounded outer edges 31 and are substantially wider adjacent said outer edges than adjacent said inner edges and are likewise inclined downwardly not only in a circumferential direction as viewed from above but also inclined downwardly and outwardly toward their wider ends as defined by the edges 31 and which are located adjacent the peripheral flange 27 and remote to the inner flange 28, all for a purpose that will hereinafter become apparent.

A dome 32 which includes a substantially hemispherical closed upper end 33 and a downwardly opening annular lower end 34 is disposed with its annular portion 34 positioned around the upper part of the pipe 9 and opening substantially below the upper end thereof. A part of the annular portion 34 is disposed snugly within and is suitably secured to the flanged inner edge 28 of the uper deflector 25 and is supported therein concentrically around the upper part of the pipe 9 to form an annular passage 35 between its portion 34 and the upper portion of the pipe 9, the lower end of which opens into the housing 10 and the upper end of which opens into the dome portion 33 and into the upper end of the pipe 9.

A headed screw 36 extends upwardly through the central part of the dome portion 33 and is secured thereto by a nut 37 which is threaded thereon for clamping the upper part of the dome portion 33 between the head of the screw and said nut 37. The screw 36 extends upwardly through an opening 38 in the central portion of the top of a hood, designated generally 39, which likewise includes an upwardly bowed circular top portion 40 and an annular depending flange 41 and which flange 41 is substantially larger in diameter than the upper portion of the housing as defined by the flange 18.

A cylindrical deflector, designated generally 42, which is open at both ends, is sized so that its bottom edge rests upon the upper side of the plate 26 around the openings 29 thereof and fits snugly within the peripheral flange 27. The upper edge of the cylinder 42 bears against an annular portion of the hood top 40 for supporting said hood 39 on the upper deflector 25. A wing nut 43 threadedly engages the upper end of the screw 36 and bears against the upper convex side of the hood top 40 for retaining the hood 39 in an applied position against the upper end of the cylinder 42 and to retain said cylinder in engagement with the upper deflector 25. As seen in Figure 2, the annular depending flange or apron 41 of the hood 39 is disposed concentrically around and is spaced a substantial distance outwardly from the cylinder 42 to provide an annular downwardly opening chamber 44 between the cylinder 42 and hood flange 41.

The cylinder 42 is provided with a series of longitudinally extending circumferentially spaced slots 45 which are formed by struck-out portions of said cylinder which are bent inwardly thereof to provide a series of upright deflector blades or vanes 46 which extend circumferentially from their secured ends to their inner, free ends or edges, as seen from above, and as best seen in Figure 3. A filtering strip 47 is secured around the outer side of the cylinder 42 and is disposed over the openings 45 to filter the air passing inwardly therethrough, said strip being formed of a relatively fine mesh wire or other suitable material.

When an internal combustion engine, not shown, to which the intake conduit 9 is connected, is in operation, a suction or downdraft will be created in the conduit 9 which will create a suction within the housing 10 and also within the chamber defined by a cylinder 42 and within the surrounding chamber 44. Consequently, air will be drawn upwardly into the chamber 44 through its open lower end and into the chamber defined by the cylinder 42 through the filtering strip 47 and the intake slots 45, as indicated by the arrows 48. It will be apparent that air which is heavy laden with dirt and other foreign particles will not be drawn upwardly as readily into the chamber 44 as the cleaner, lighter air. Furthermore, a substantial portion of the dirt and foreign matter in the air entering the chamber 44 will be separated therefrom as the air passes through the filter 47. The air after passing inwardly through the slots 45 strikes the deflector vanes 46 and is caused to travel in a circular path within the cylinder 42, as indicated by the arrow 49 in Figure 3, and additionally is deflected to travel clockwise as seen in Figure 3 not only by the vanes 46 but also by impingement of the air against the upper portion of the hood 32. The suction within the upper portion of the housing 10 beneath and adjacent the open lower end of the dome portion 34 will draw the air which is traveling clockwise within the cylinder 42 downwardly through the openings 29 as indicated by the arrows 50 in Figure 2. As the air is drawn downwardly through the openings 29 while traveling in a clockwise direction, the air will be deflected downwardly and outwardly with respect to the housing 10 and away from the lower end of the passage 35 by the under sides of the deflector blades 30. After the air passes through the openings 29 upon reaching the level of the open lower end of the hood 32, the suction in said open end will draw the air inward and upward into the passage 35. The dirt and foreign matter carried by the air will be separated therefrom by flipping action as the air, which is lighter than the dirt and foreign matter, is drawn upwardly and inwardly into the passage 35 and thus separated from the heavier downwardly traveling dirt particles by this whirlwind action. The particles of dirt and foreign matter will then strike the under sides of the bottom deflector blades 23 and will be deflected downwardly thereby toward the housing bottom and will be trapped in the housing enlargement 13 and discharged therefrom by gravity into the receptacle 15 which is removable for emptying the dirt therefrom. The air, thus cleansed, after being drawn by suction upwardly through the passage 35, as indicated by the arrows 51 in Figure 2, is drawn downwardly as indicated by the arrows 52 through the pipe 9 into the engine, not shown.

It will thus be readily apparent that an air cleaner of extremely simple construction has been provided wherein air is initially drawn upwardly into the cleaner and partially filtered by the mesh wire fabric 47 and thereafter subjected to a centrifugal action for imparting a whirling motion to the air. The air is then drawn downwardly through a deflector means whereby the air is deflected downwardly and outwardly and then subjected to an upward suction for drawing the air inwardly and upwardly. This sudden upward movement of the air separates the dirt and foreign matter therefrom by a whirlwind action as the dirt and foreign matter are in effect flipped from the air and continue their downward travel as the cleansed air moves upwardly toward the air intake pipe.

Various modifications and changes are contemplated and may obviously be resorted to, without departing from the spirit or scope of the invention as hereinafter defined by the appended claims.

I claim as my invention:

1. The combination with an air conduit having an open upper inlet end through which air is adapted to be drawn by suction, of an air cleaner including a housing disposed around a portion of said air conduit and secured thereto, a dirt collecting receptacle detachably connected to a bottom portion of the housing and communicating with the housing interior, said housing having an open upper end disposed around and spaced from the open upper end of said air conduit, an annular deflector member secured in the open end of said housing having circumferentially spaced air passages and downwardly and outwardly inclined deflector vanes all extending and curved in the same direction, a cylinder supported on and rising from said annular deflector member and disposed around the air passages, said cylinder having a series of longitudinally extending circumferentially spaced slots and a series of baffles projecting from its inner side and from corresponding longitudinal edges of said slots, all of said baffles extending in the same direction and in the same direction as said deflector vanes, a dome disposed over and spaced from the upper end of the inlet conduit having a portion disposed in the annular deflector member and secured thereto for supporting the dome concentrically around the air conduit, said dome having an open lower end disposed beneath the upper end of said air conduit and spaced radially therefrom and having a closed upper end extending into said cylinder, and a hood supported on and closing the open upper end of said cylinder having a depending annular flange disposed around and spaced outwardly from the cylinder and opening at its bottom edge above the upper end of the housing whereby air is drawn upwardly into the hood and through the slots of said cylinder and is caused to revolve within the cylinder by the cylinder baffles, the air being drawn downwardly into the housing through the air passages of the annular deflector member and being deflected downwardly and outwardly with respect to the housing by said deflector vanes for separating dirt and foreign matter from the air and whereby the dirt is conveyed by gravity into the bottom of the housing and through its outlet into the collecting receptacle, the cleansed air being drawn upwardly into the dome through the annular downwardly opening passage defined by the bottom portion of the dome and air conduit and being drawn by suction from the upper portion of the dome downwardly through the air conduit.

2. An air cleaner as in claim 1, and a strip of filtering material secured around said cylinder over the slots thereof for initially cleansing the air entering the cylinder.

3. An air cleaner as in claim 1, said dome having a substantially hemispherical closed upper end combining with said baffles for imparting a centrifugal whirling action to the air within the cylinder.

4. An air cleaner as in claim 3, a screw secured to and rising from the upper end of said dome and extending through the central portion of the top of said hood, and a nut engaging said screw and bearing against the outer side of the hood for retaining the hood positioned against the upper end of the cylinder and for retaining the lower end of the cylinder against the annular deflector member, said screw and nut detachably retaining the cylinder and hood in applied positions.

5. An air cleaner as in claim 1, and a bottom deflector member disposed in said housing below the lower end of said hood having a hub portion secured around the air conduit and a rim portion disposed against a portion of the housing, a plurality of spokes connecting the hub portion and rim portion each including a relatively wide blade, said blades being inclined circumferentially and forming deflector blades for deflecting the dirt and foreign matter separated from the air downwardly relatively to the housing by impingement against inclined under surfaces of said blades.

6. An air cleaner as in claim 5, each of said blades being inclined downwardly and outwardly from its inner to its outer end.

7. An air cleaner as in claim 1, said housing including a relatively long downwardly tapered funnel shaped portion and a relatively short upwardly tapered frusto-conical portion terminating at the open upper end of said housing whereby the air deflected downwardly and outwardly by the deflector vanes will be initially directed toward the housing portion of larger diameter.

8. The combination with a downdraft air conduit having an open upper end through which air is adapted to be drawn by suction, of a housing supported on and surrounding the upper portion of said conduit having a relatively large open upper end surrounding the upper portion of said conduit and a dust outlet at its lower end, a dome disposed over the upper end of said conduit having an open lower end disposed around and spaced from the conduit and opening within said housing below the upper end of said conduit, an annular deflector member having an outer edge secured to the open upper end of said housing and an inner edge secured around said dome above its open lower end, said annular deflector member having circumferentially spaced air passages and circumferentially spaced downwardly and outwardly inclined deflector vanes for deflecting air passing downwardly through said passages downwardly and outwardly relatively to the housing, and a cylindrical member rising from and supported by the annular deflector member around the air passages, said cylindrical member having longitudinally extending circumferentially spaced air slots and circumferentially spaced inwardly extending baffles projecting from corresponding longitudinal edges of said slots, all of said baffles extending generally circumferentially of the cylindrical member in the same direction as said deflector vanes for imparting a whirling motion to air entering the cylinder.

9. An air cleaner as in claim 8, and a hood supported on and closing the upper end of said cylinder having a depending annular flange disposed around and spaced outwardly from the slotted portion of the cylinder and defining therewith an annular downwardly opening passage through which air is drawn upwardly into the hood and thence through said slots into said cylindrical member.

HENRY F. REIMANN.

REFERENCES CITED

The following references are of record in the file of this patent:

UNITED STATES PATENTS

| Number | Name | Date |
|---|---|---|
| 548,490 | Weck et al. | Oct. 22, 1895 |
| 863,189 | Lauritzen | Aug. 13, 1907 |
| 2,134,978 | Marshall | Nov. 1, 1938 |
| 2,193,479 | Donaldson | Mar. 12, 1940 |
| 2,304,778 | Cresswell | Dec. 15, 1942 |
| 2,586,243 | McDougall | Feb. 19, 1952 |